United States Patent [19]
Oh

[11] Patent Number: 5,729,572
[45] Date of Patent: Mar. 17, 1998

[54] TRANSMITTING AND RECEIVING SIGNAL SWITCHING CIRCUIT FOR WIRELESS COMMUNICATION TERMINAL

[75] Inventor: Kyoung Bong Oh, Kyoungki-do, Rep. of Korea

[73] Assignee: Hyundai Electronics Industries Co., Ltd., Kyoungki-Do, Rep. of Korea

[21] Appl. No.: 464,066

[22] Filed: Jun. 5, 1995

[30] Foreign Application Priority Data

Dec. 30, 1994 [KR] Rep. of Korea ............... 94-39859

[51] Int. Cl.$^6$ ............................................. H04B 1/38
[52] U.S. Cl. ............................................. 375/219; 370/357
[58] Field of Search ............................. 375/219, 200, 375/208, 347, 357; 330/263; 370/27, 32, 95.1; 455/38.3, 12.1, 20, 53.1, 54.1, 67.1

[56] References Cited

U.S. PATENT DOCUMENTS

| | | | |
|---|---|---|---|
| 5,084,637 | 1/1992 | Gregor | 375/219 |
| 5,325,395 | 6/1994 | Tran | 375/219 |
| 5,388,100 | 2/1995 | Ohtsuka | 370/95.1 |
| 5,442,653 | 8/1995 | Saito | 375/219 |
| 5,499,269 | 3/1996 | Yoshino | 375/219 |
| 5,513,211 | 4/1996 | Yabusaki et al. | 375/219 |

*Primary Examiner*—Stephen Chin
*Assistant Examiner*—Joseph Roundtree
*Attorney, Agent, or Firm*—Fish & Richardson P.C.

[57] ABSTRACT

A transmitting and receiving signal switching circuit for a wireless communication is disclosed, in which, in an initial portion of a wireless communication apparatus, i.e., in a high output amplifier and in a low noise amplifier, when signals are transmitted, the power source of the low noise amplifier is disconnected, and when signals are received, the power source of the high output amplifier is disconnected, thereby switching the transmitting and receiving signals. According to the present invention as described above, a switching circuit is used, so that the communication apparatus would become compact and convenient, and that the power consumption can be reduced. Further, the deterioration of the involved components can be prevented, thereby extending the life expectancy of the apparatus. Further, the number of the components are reduced, so that the manufacturing cost can be saved. Further, the circuit of the present invention can be applied not only to the wireless communication, but also to other data communications.

6 Claims, 5 Drawing Sheets

TRANSMITTING AND RECEIVING SIGNAL SWITCHING CIRCUIT FOR WIRELESS COMMUNICATION TERMINAL

BACKGROUND OF THE INVENTION

1. Field of the Invention

The present invention relates to a transmitting and receiving signal switching circuit for a wireless communication system, in which, in an initial portion of a wireless communication apparatus, i.e., in a high output amplifier and in a low noise amplifier, when signals are transmitted, the power source of the low noise amplifier is disconnected, and when signals are received, the power source of the high output amplifier is disconnected, thereby switching the transmitting and receiving signals.

2. Description of the Prior Art

Conventionally, a transmitting part and a receiving part are provided with a signal transferring system and a power supply system respectively, so that power can be supplied to the transmitting and receiving parts all the time. Further, a relay switch is used to switch the transmission and receiving. In this conventional circuit, the power is supplied all the time, and therefore, the involved components are deteriorated, as well as increasing the power consumption. Further, the operation is carried out with a large power, and therefore, the product size is increased, as well as increasing the manufacturing cost, while the maintenance becomes complicated.

U.S. Pat. No. 5,388,100 discloses a technique on a switching circuit for use in transmitting and receiving wireless communication signals. According to this disclosure, a spike phenomenon which is connected to the next stage is prevented through a switching operation of a diversity antenna and through a replacement of a time slot in a wireless communication multiplexer. Further, through the same means, the data which are received into a wireless communication receiving terminal are restored, and reproduction clock signals which are generated from a plurality of time slots are selected. Therefore, when the time slots are replaced, or when the received data are determined, synchronization is established by using an internal clock generator for removing errors and noises caused by a phase difference between the respective slots or between the antennas. Thus accurate data having no noise are received.

That is, the apparatus includes: a plurality of selectors for receiving reproduction clock signals from respective time slots, and for selecting one set of the clock signals in accordance with data simultaneously outputted by the respective time slots; a time-dividing timing control circuit connected to the respective selectors for separating the data received from the respective time slots, and for switching the outputs of the respective selectors in accordance with an established synchronization; an internal clock generator for generating internal clock signals; a control circuit for controlling the output of the internal clock signals and their selections during the switching operation of the outputs of the respective selectors by the time-dividing timing control circuit; and a switching circuit for receiving the selector-selected reproduction clock signals to select one from among the reproduction clock signals and the internal clock signals.

The above components are added to the existing communication circuit to achieve the intended object.

Therefore, the above described technique is different from the present invention in which, in a wireless communication system, when the signals are transmitted, the power source is disconnected by means of a low noise amplifier, and, when the signals are received, the power source is disconnected by means of a high output amplifier, so as to switch the transmitting and receiving circuit, so that the power source would be supplied only to the operating circuit, and that the intended function can be carried out with a small power consumption.

That is, the above technique is similar to the present invention in that a switching function is added to the existing communication circuit. However, a difference is seen in the constitution of the switching circuit and in the auxiliary circuits. Further, the intended objects are different from each other, and therefore, a mutual adaptation is impossible.

SUMMARY OF THE INVENTION

The present invention is intended to overcome the above described disadvantages of the conventional techniques.

Therefore it is the object of the present invention to provide a transmitting and receiving signal switching circuit for a wireless communication terminal, in which, in a wireless communication system, when the signals are transmitted, the power source is disconnected by means of a low noise amplifier, and, when the signals are received, the power source is disconnected by means of a high output amplifier so as to switch the transmitting and receiving circuit, so that the power source would be supplied only to the operating circuit, and that the intended function can be achieved out with a small power consumption.

In achieving the above object, the switching circuit according to the present invention is characterized in that the power source system which has been provided separately to the transmission and receiving is provided in the form of comparators and a schmidt trigger method by utilizing OP amplifiers. Further, a switching circuit is used for controlling a control diode with this power source, thereby simplifying the power source system. Further, instead of switching the transmitting and receiving systems by means of relays in a main body of the power supply unit, a control diode is used in the switching circuit in the present invention, with the result that the power consumption is decreased. Further, in the conventional circuit, the power is supplied to both the transmitting and receiving systems even when signals are not being transferred, thereby deteriorating the involved components. This problem is solved in the present invention by arranging that the power is supplied only to the active system, with the result that the operation is rendered possible with a decreased power consumption.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
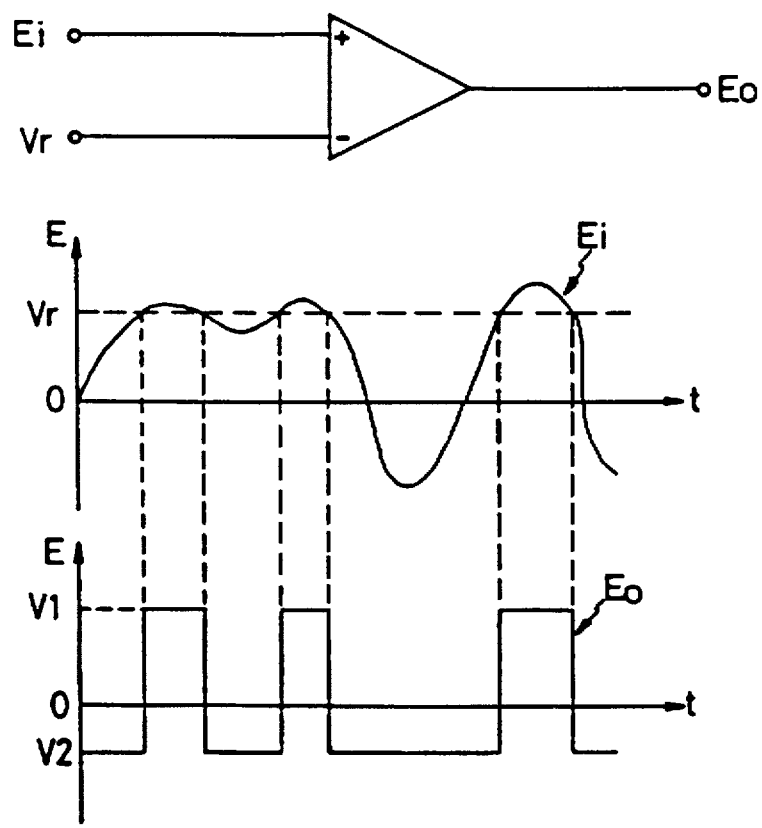
FIG. 1 illustrates curves showing input/output characteristics of the comparators.
Figure 2:
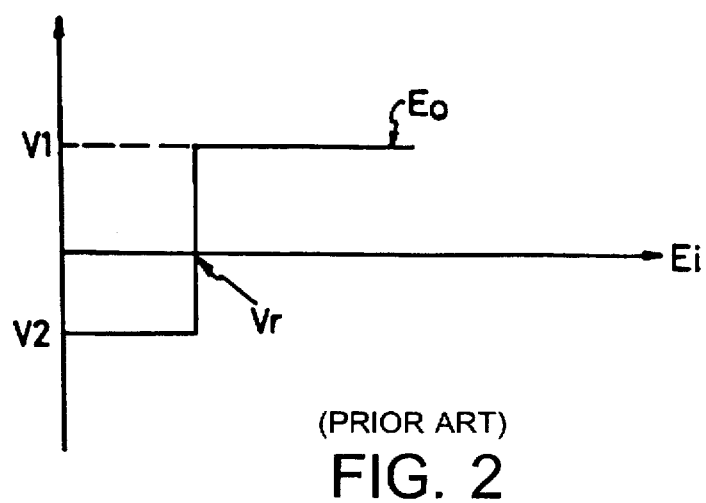
FIG. 2 illustrates curves showing transfer characteristics of the comparators.

In the present invention, the comparators are a voltage comparators, and judges as to whether an inputted signal is higher or lower than a reference voltage. The comparators are also called level detectors. The input/output characteristics of the comparators are illustrated in FIG. 1, and, only when a positive input voltage terminal Ei is higher than a reference voltage Vr of a negative terminal, an output voltage is generated. Such transfer characteristics of the comparators are illustrated in FIG. 2. If the input voltage Ei is higher than the reference voltage Vr, an output voltage Eo generates a voltage V1, while, if the input voltage Ei is lower than the reference voltage Vr, the output voltage Eo generates a voltage V2. Even if the difference between the input voltage Ei and the reference voltage Vr is very small, the circuit responds owing to the high gain of the OP amplifiers.

Figure 3:
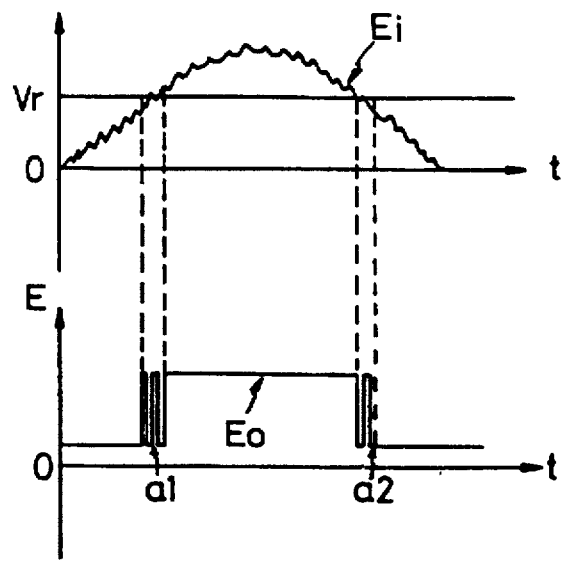
FIG. 3 illustrates the input/output characteristics for case where the schmidt trigger is not used.
Figure 4:
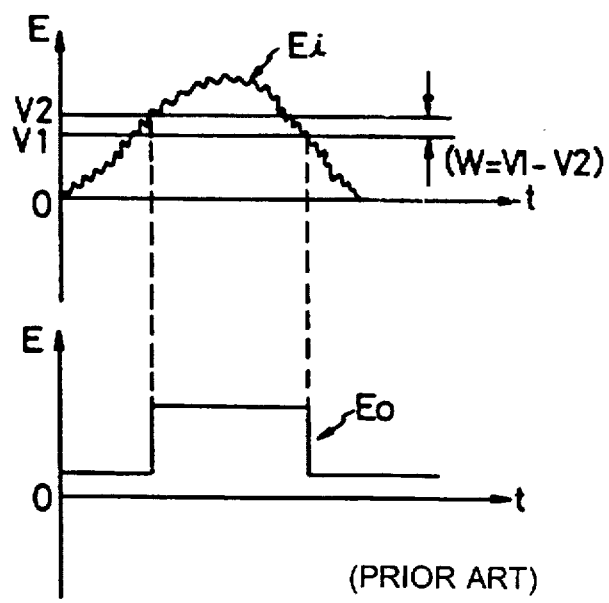
FIG. 4 illustrates the input/output characteristics for the case where an improvement is realized by using the schmidt trigger.

The schmidt trigger is a kind of comparator, and its input/output characteristics become different depending on the increase or decrease of the input. In this way, it inhibits the noise within the hysteresis voltage width. The characteristics of the schmidt trigger are illustrated in FIGS. 3 and 4, and FIG. 3 illustrates the input/output characteristics before an improvement, while FIG. 4 illustrates the input/output characteristics after an improvement by means of the schmidt trigger. In FIG. 3, a1 and a2 indicate portions in which noises are generated, while, in FIG. 4, Wo=V2−V1 indicates the hysteresis width.

Figure 5:
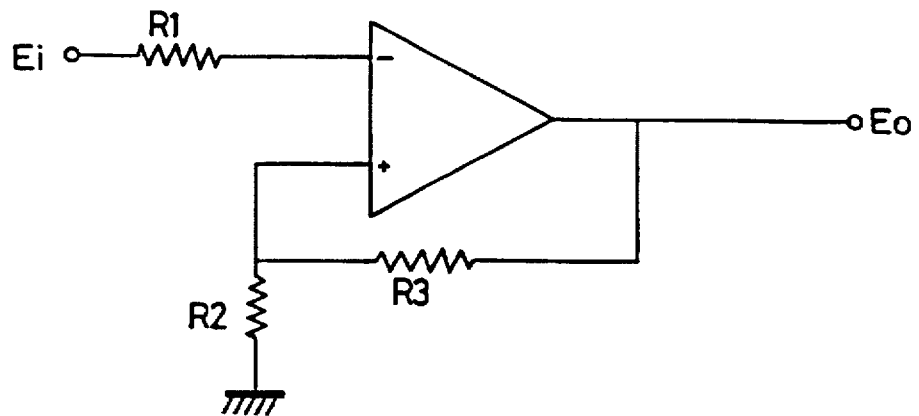
FIG. 5 illustrates the general constitution of the schmidt trigger.

FIG. 5 illustrates the general constitution of the schmidt trigger. Here, owing to the fact that positive feedbacks are imposed on resistors R2 and R3, the reference voltage value of the comparator is varied in accordance with the state of the output voltage, thereby making it possible to obtain hysteresis characteristics.

Figure 6:
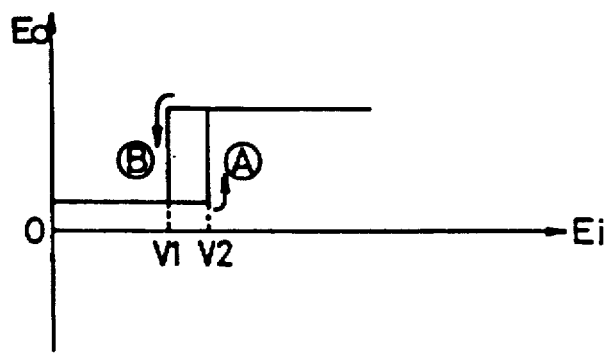
FIG. 6 illustrates curves for the transfer characteristics of the schmidt trigger.

Such transfer characteristics of the schmidt trigger is illustrated in FIG. 6, and as shown in this drawing, when the input voltage Ei is increased, a curve A is used, while, when the input voltage Ei is decreased, a curve B is used.

Figure 7:
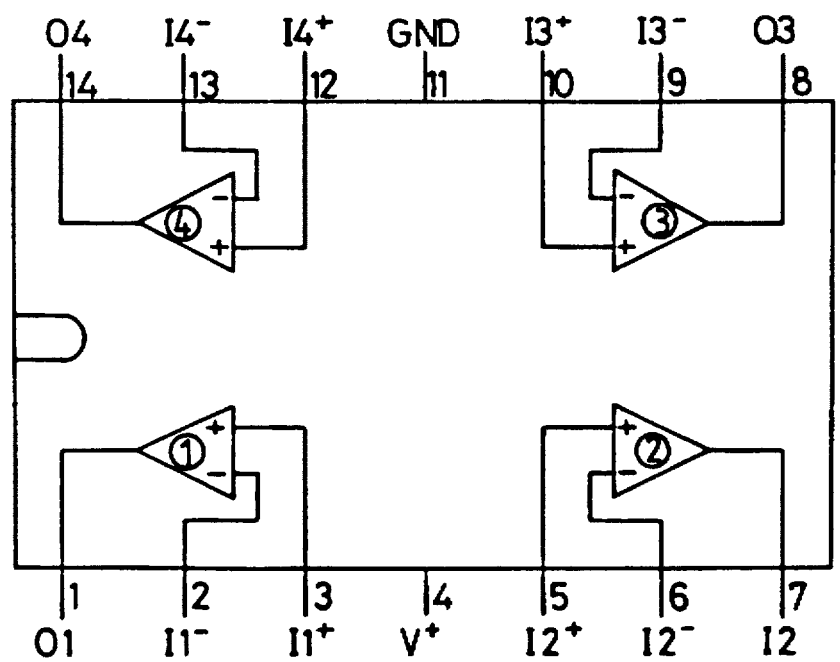
FIG. 7 illustrates the internal circuit of the "LM324" used in the present invention.

In forming the circuit of the present invention, there is used Model No. LM 324 of National Company, in which four OP amplifiers are inserted into one package. The internal constitution of this package is illustrated in FIG. 7. Of the four OP amplifiers, the actually used ones are OP amplifiers 1, 2 and 3, and of these three OP amplifiers, the first and the third OP amplifiers 1 and 3 are used as the comparators, while the second OP amplifier 2 is used as the schmidt trigger in which a resistor is connected to the outside of it for positive feedback.

Figure 8:
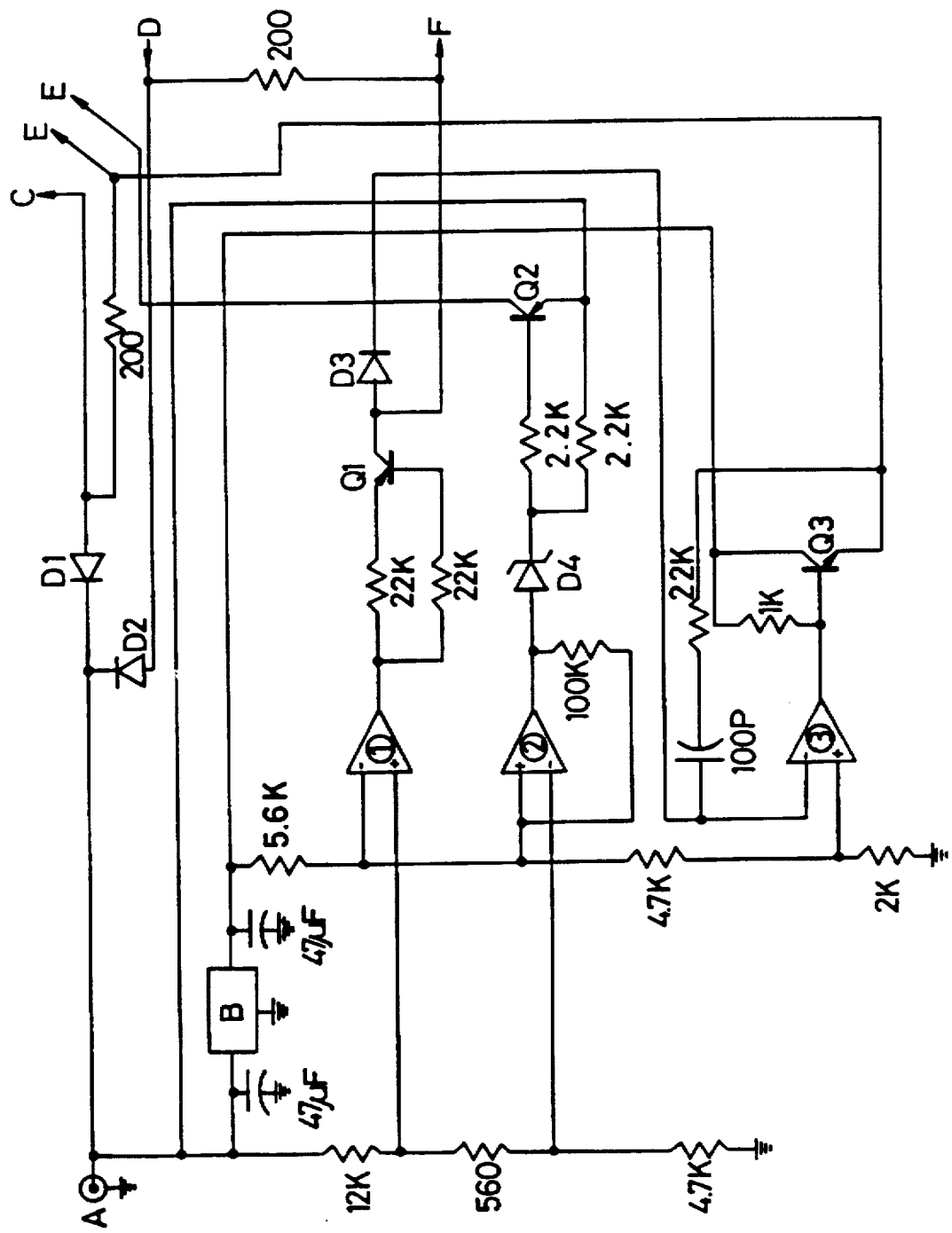
FIG. 8 illustrates the entire circuit of the switching circuit according to the present invention.

FIG. 8 illustrates the entire portion of the switching circuit of the present invention, which has the above described characteristics.

The transmission and receiving of the system of the present invention are adjusted by using three OP amplifiers in which different voltages are used, i.e., a voltage of 15V for receiving, and a voltage of 23V for transmission. The power supply is carried out through a terminal A. That is, a voltage of 15V is supplied through the terminal A in the case of receiving, while a voltage of 12V is formed by a voltage regulator B to supply it to the respective OP amplifiers 1, 2 and 3.

First, in the case of receiving, a voltage of 15V is supplied through the terminal A, and, since the input voltage (the positive terminal of the OP amplifier) of the comparator 1 is lower than the reference voltage (the negative terminal), and therefore, the comparator 1 is turned off. The turning-off of the comparator 1 is followed by a turning-on of a transistor Q1, and therefore, the power source is supplied to a bias terminal F of the low noise amplifier of the receiving end, while a receiving adjusting second diode D2 is turned on. In other words, comparator 1 (i.e. the first OP amplifier) is turned off for making a signal receiving path short-circuited, so as to turn on the receiving signal adjusting second diode D2.

Meanwhile, the input voltage (the negative terminal) of the schmidt trigger 2 is lower than the reference voltage (the positive terminal), and therefore, the schmidt trigger 2 is turned on. Therefore, a voltage of 15V is supplied through a zener diode D4 to the base of a transistor Q2, while the input voltage of 15V is supplied to the emitter of the second transistor Q2 so as to turn off the transistor Q2. Therefore, the power is not supplied to a bias terminal of the high output amplifier of the transmitting end, and at the same time, an adjusting first diode D1 of the transmitting end is turned off. In other words, the bias terminal E of the high output amplifier of the transmitting end and the transmitting signal adjusting first diode D1 are turned off to open a transmitting signal transfer path. Further, the output of the transistor Q1 is supplied through a diode D3 in the forward direction, and therefore, the third diode D3 is turned on. Further, the output voltage of the diode D3 is supplied to the negative terminal of the comparator 3 so as to become higher than the reference voltage of the positive terminal, and therefore, the comparator 3 is turned off. Then the output of the comparator 3 is supplied to the base of a transistor Q3 so as to turn off the transistor Q3.

Through the above described operations, in the case of reception, the power is supplied only to the bias terminal F of the low noise amplifier of the receiving end, while the power is not supplied to a bias terminal E of the high output amplifier of the transmitting end.

On the other hand, in the case of transmission, when a power of 23V is supplied through a terminal A, a reference voltage is formed by a 12V regulator B so as to be supplied to the respective OP amplifiers 1, 2 and 3. Under this condition, the input voltage of the positive terminal of the comparator is higher than the reference voltage (the negative terminal), and therefore the comparator is turned on. The turning-on of the comparator 1 is followed by a turning-off of the transistor Q1, and therefore, the power is turned off for the bias terminal F of the low noise amplifier of the receiving end, while the receiving adjusting diode D2 is turned off. In other words, the comparator 1 (i.e. the first OP amplifier) is turned on for opening a receiving signal transfer path so as to turn off the receiving signal adjusting second diode D2.

Meanwhile, the schmidt trigger 2 is turned off, because the input voltage (the negative terminal) is higher than the reference voltage (the positive terminal). Therefore, a voltage of 15V is supplied through a zener diode D4 to the base of the transistor Q2, and a voltage of 23V is supplied to the emitter of the transistor Q2, thereby turning on the transistor Q2. Therefore, the power is supplied to the bias terminal E of the high output amplifier of the transmitting end, the power source for the bias terminal F of the low noise amplifier of the receiving end is disconnected, and the transmitting signal adjusting first diode D1 is turned on, to make the transmitting signal transfer path short-circuited. Under this condition, the output of the first transistor Q1 is supplied to the diode D3 in the reverse direction so as to turn off the diode D3, and the same output voltage is supplied to the negative terminal of the comparator 3 to make the voltage of the negative terminal lower than the reference voltage of the positive terminal so as to turn on the comparator 3. Accordingly, the output of the comparator 3 is supplied to the base of the third transistor Q3 to turn on the transistor Q3, so that the power can be supplied to the bias terminal E of the high output amplifier of the transmitting end.

According to the present invention as described above, a switching circuit is used, so that the communication apparatus would become compact and convenient, and that the power consumption can be decreased. Further, the deterioration of the involved components can be prevented, thereby extending the life expectancy of the apparatus. Further, the number of the components is reduced, so that the manufacturing cost can be saved. Further, the circuit of the present invention can be applied not only to the wireless communication, but also to other data communications.

What is claimed is:

1. A circuit for switching transmitting and receiving signals for a wireless communication terminal, comprising:

a terminal for receiving output from a power source;

a voltage regulator for adjusting the output received by said terminal into a reference voltage;

first, second and third OP amplifiers for receiving voltages from said voltage regulator respectively;

a first transistor switched by a voltage from said first OP amplifier;

a first bias terminal for a low noise amplifier which receives signals, wherein power is supplied to said first bias terminal according to switching operations of said first transistor;

a second transistor switched by a voltage from said second OP amplifier;

a second bias terminal for a high output amplifier which transmits signals, wherein power is supplied to said second bias terminal according to switching operations of said second transistor;

a first diode for adjusting transmitted signals;

a second diode for adjusting received signals;

a third diode switched by switching operations of said first transistor;

said third OP amplifier turned on/off by said third diode; and a third transistor switched by an output from said third OP amplifier.

2. The circuit as claimed in claim 1, wherein said second OP amplifier is used as a schmidt trigger for inhibiting noise and for obtaining stable input/output characteristics.

3. The circuit as claimed in claim 1, wherein, during a receiving, said first OP amplifier is turned off for making a signal receiving path short-circuited, so as to turn on said receiving signal adjusting second diode.

4. The circuit as claimed in claim 1, wherein, during a receiving, said second bias terminal of said high output amplifier of the transmitting end and said transmitting signal adjusting first diode are turned off to open a transmitting signal transfer path.

5. The circuit as claimed in claim 1, wherein, during a transmission, said first OP amplifier is turned on for opening a receiving signal transfer path so as to turn off said receiving signal adjusting second diode.

6. The circuit as claimed in claim 1, wherein, during a transmission, the power source for said first bias terminal of said low noise amplifier of the receiving end is disconnected, and said transmitting signal adjusting first diode is turned on, to make the transmitting signal transfer path short-circuited.

* * * * *